United States Patent
Soga et al.

[11] Patent Number: 5,928,301
[45] Date of Patent: Jul. 27, 1999

[54] CONTROLLER FOR VEHICLE

[75] Inventors: Yoshinobu Soga; Yuji Hattori, both of Susono, Japan

[73] Assignee: Toyota Jidosha Kabushiki Kaisha, Toyota, Japan

[21] Appl. No.: 08/703,461

[22] Filed: Aug. 27, 1996

[30] Foreign Application Priority Data

Aug. 31, 1995 [JP] Japan .................................. 7-223973

[51] Int. Cl.⁶ .......................... G06F 17/00; G06F 19/00; G06F 7/00
[52] U.S. Cl. ................................ 701/51; 701/54; 701/84; 477/31; 477/37
[58] Field of Search ................................. 701/51, 52, 53, 701/54, 75, 84, 85, 87, 90, 93, 96; 477/14, 31, 37, 48, 3; 180/65.1, 65.2, 65.5, 377

[56] References Cited

U.S. PATENT DOCUMENTS

| | | | |
|---|---|---|---|
| 3,620,323 | 11/1971 | Maeda et al. .......................... | 180/65.2 |
| 4,161,116 | 7/1979 | Fegraus et al. ............................ | 73/117 |
| 4,165,795 | 8/1979 | Lynch et al. ............................. | 180/65.2 |
| 4,719,861 | 1/1988 | Savage et al. ........................... | 104/165 |
| 5,088,355 | 2/1992 | Sugaya et al. ............................ | 477/41 |
| 5,117,931 | 6/1992 | Nishida ................................... | 180/65.2 |
| 5,337,848 | 8/1994 | Bader ..................................... | 180/65.2 |
| 5,441,030 | 8/1995 | Satsukawa .............................. | 123/491 |
| 5,508,574 | 4/1996 | Vlock ..................................... | 310/113 |

FOREIGN PATENT DOCUMENTS 23 32 514 A1  1/1975  Germany .
2-3101 U  1/1990  Japan .

Primary Examiner—William A. Cuchlinski, Jr.
Assistant Examiner—Gertrude Arthur
Attorney, Agent, or Firm—Oliff & Berridge, PLC

[57] ABSTRACT

A control apparatus for a vehicle includes a power transmitting system between an engine and wheels. The transmitting system has a continuously variable transmission (CVT) and a motor-generator actuated in one of a regenerating operation mode and an assisting operation mode. The motor-generator serves as a generator in a regenerating operation mode and as a motor in an assisting operation mode. The apparatus includes an electric control unit (ECU) that determines a shift of engine speed, computes the total amount of torque of the engine, the CVT and the motor-generator and selects one of the operation modes and actuates the motor-generator base on the selected operation mode to corrects the engine speed.

25 Claims, 12 Drawing Sheets

Fig.3
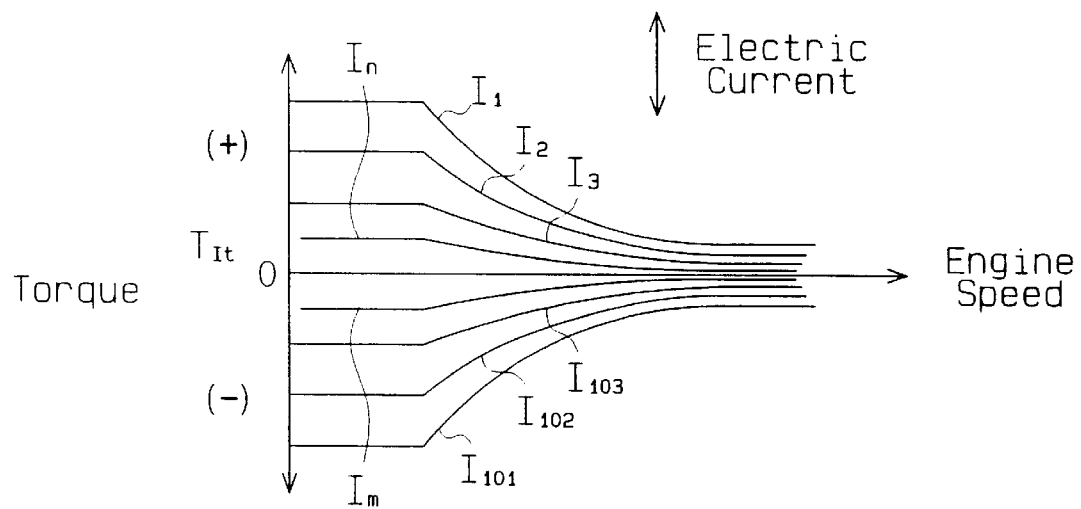
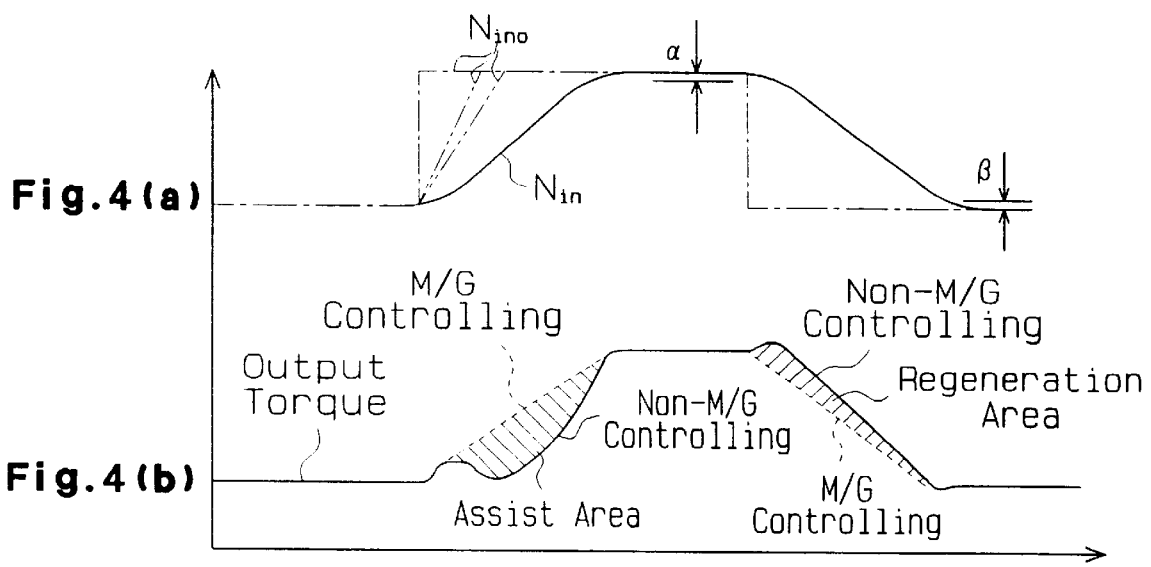
Fig.4(a)
Fig.4(b)

CONTROLLER FOR VEHICLE

BACKGROUND OF THE INVENTION

1. Field of the Invention

The present invention relates to vehicle controllers, and more particularly, to vehicle controllers provided with a continuously variable transmission and a motor-generator.

2. Description of the Related Art

Vehicles engines are generally provided with an alternator to generate electric power and a starting motor to start the engine. A motor-generator that combines the functions of both an alternator and a starting motor has recently been proposed for engines. The motor-generator basically includes a rotary shaft, a rotor core, and a stator core. The rotary shaft rotates integrally with a crankshaft, which is rotated by the engine. The rotor is provided on the rotary shaft. A wire is wound about the rotor. The stator core is fixed to an engine body. A stator wire is wound about the stator core to constitute an inductor. A voltage having a predetermined frequency is applied to the motor-generator's stator wire to produce a rotary magnetic field, the frequency of which is advanced with respect to the rotating speed of the rotary shaft. This causes the motor-generator to function as a motor. The rotational drive force of the motor applies a force to start the engine. When the vehicle is traveling, the motor adds accelerating force to the engine.

The motor-generator also functions as a generator when a rotary magnetic field having a frequency delayed with respect to the rotating speed of the rotary shaft is applied. In such a state, the motor-generator produces electric power. Proposals have been made to enhance the engine torque and to improve fuel consumption by motor-generators.

For example, Japanese Unexamined Utility Model 2-3101 describes a vehicle provided with a motor-generator and a continuously variable transmission. The publication proposes methods to improve the energy balance of the engine, upgrade fuel consumption, and enhance engine maneuverability that includes factors such as the acceleration and deceleration ability. In this publication, the motor-generator functions as a generator in correspondence with an engine brake. This decreases the engine speed by applying torque to the engine. However, the motor function of the motor-generator is not effectively used to compensate the engine speed.

The continuously variable transmission has a continuous shifting characteristic and is thus optimum for the purpose of improving maneuverability. However, the continuously variable transmission has a few characteristic problems such as torque fluctuation caused by the moment of inertia that is applied to an input shaft of the transmission. Thus, the combination of the continuously variable transmission and the motor-generator may result in deficiencies.

SUMMARY OF THE INVENTION

Accordingly, it is an objective of the present invention to improve the performance of a continuously variable transmission, provided in a vehicle together with a motor-generator, through the cooperation between the motor-generator and the variable transmission.

Another objective of the present invention is to provide a controller for a vehicle that compensates a torque level resulting from the moment of inertia in an engine, motor-generator, and a continuously variable transmission. The compensation enables the speed to be accurate during operation.

It is also an objective of the present invention to provide a controller for a vehicle that ensures stable assist controlling of the engine regardless of an electric power source being in a low voltage state.

A further objective of the present invention is to provide a controller for a vehicle that enables manual shift down to be performed smoothly.

Another objective of the present invention of the present invention is to provide a controller for a vehicle that enables a balanced shifting value with respect to a target vehicle speed during operation.

A final objective of the present invention is to provide a controller for a vehicle that enables the rotating speed of the continuously variable transmission and the engine to be maintained in a substantially constant state. This enables the operating state to be maintained in a satisfactory state.

To achieve the above objectives a control apparatus for a vehicle includes a power transmitting system between an engine and wheels. The transmitting system has a continuously variable transmission (CVT) and a motor-generator actuated in one of a regenerating operation mode and an assisting operation mode. The motor-generator serves as a generator in a regenerating operation mode and as a motor in an assisting operation mode.

In one aspect of the present invention, the control apparatus includes determining means for determining a shift of engine speed, computing means for computing a total moment of inertia of the engine, the CVT and the motor-generator, and correcting means for correcting the engine speed. The correcting means selects one of the operation modes of the motor-generator to actuate the motor-generator based on the selected operation mode.

In another aspect of the present invention, the motor-generator actuated in the regenerating operation mode charges power source to induce torque required for reducing the engine speed. A maximum chargeable voltage is determined based on a currently residual voltage in the power source. The speed of the vehicle is manually shifted. The control apparatus includes detecting means for detecting the manual shift operation for reducing a speed of the vehicle, computing means for computing the required torque based on the vehicle speed and an acceleration of the vehicle, comparing means for comparing the required torque and the maximum chargeable voltage, and control means for controlling the motor-generator. The control means actuates the motor-generator in the regenerating operation mode based on the required torque being smaller than the maximum chargeable voltage. The control means controls to reduce the rotational speed of the CVT based on an excessive level of the required torque when the required torque is greater than the maximum chargeable voltage.

In a further aspect of the present invention, the control apparatus includes recognizing means for recognizing a shift of the engine speed shift, and actuating means for actuating the motor-generator in one of the operation modes in accordance with the recognized shift of the engine speed.

In still another aspect of the present invention, the motor-generator is actuated in one of the regenerating operation mode to charge a power source and reduce the engine speed and the assisting operation mode to increase the engine speed. The control apparatus includes hydraulic control means for controlling the CVT, and detecting means for detecting a temperature of fluid in the hydraulic control means being smaller than a predetermined magnitude. The predetermined magnitude is a minimum level for ensuring a start-up pressure of the fluid. The apparatus further includes determining means for determining an increase of the engine speed, computing means for computing torque required to reduce the engine speed in association with a delay of the start-up pressure of the fluid, and actuating means for actuating the motor-generator in the regenerating mode to charge the power source with voltage based on the required torque.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 3 is a characteristic diagram showing the relationship between the engine speed and the torque of a motor-generator;

FIGS. 4(a) and 4(b) are a time chart of an output torque and a CVT input shaft rotating speed;

DETAILED DESCRIPTION OF THE PREFERRED EMBODIMENT

An embodiment of vehicle controller according to an embodiment of the present invention will hereafter be described with reference to FIGS. 1 to 15.

Figure 1:
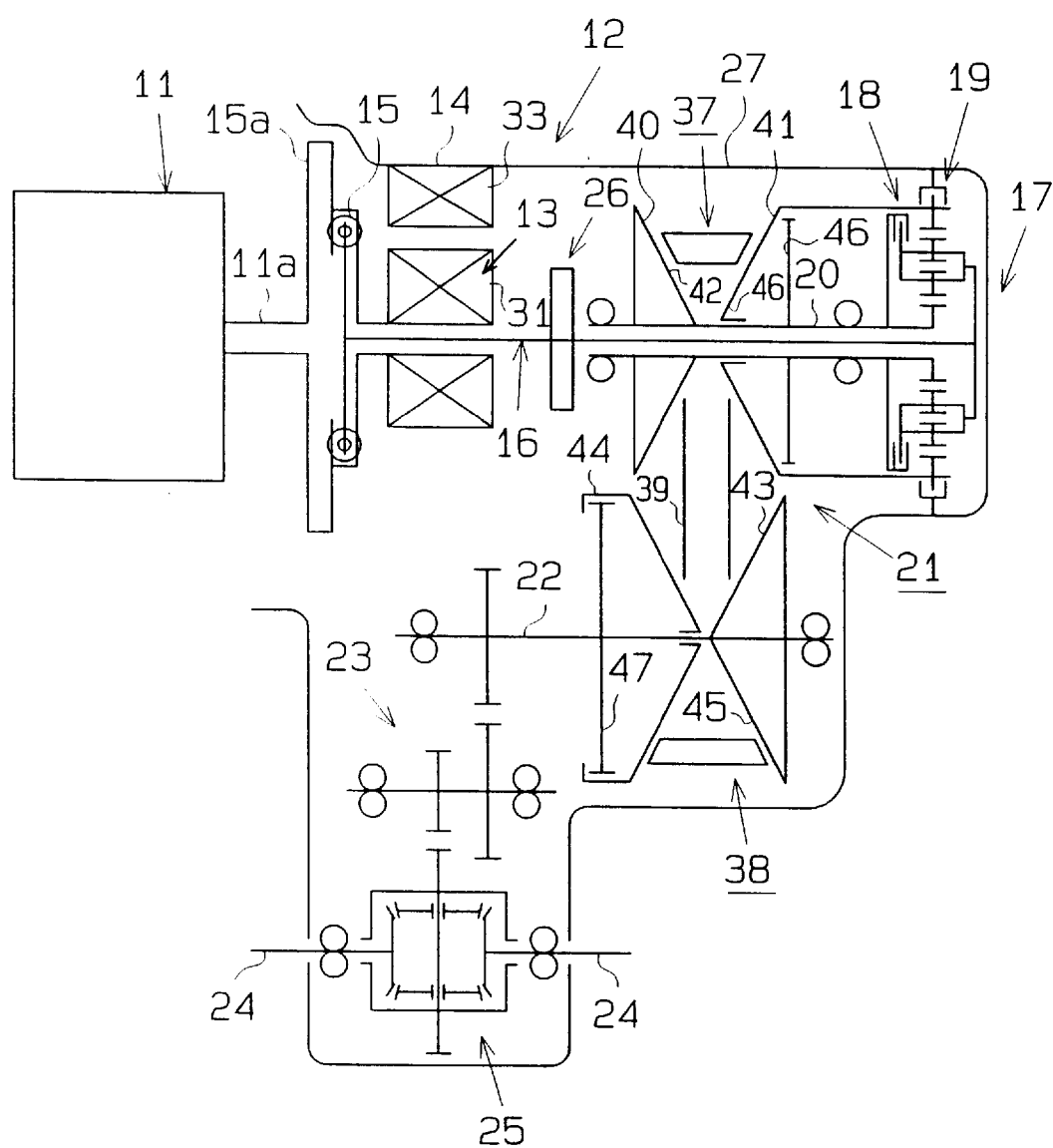
FIG. 1 is a schematic drawing of a vehicle power transmission system according to an embodiment of the present invention.

FIG. 1 illustrates a vehicle transmission system. A casing 15a for a damper 15 connects a crankshaft 11a of an engine 11 to a rotor 13 of a motor-generator 12. The power of the engine 11 is transmitted to an input shaft 16 by way of the damper 15. The power transmitted to the input shaft 16 is conveyed to a forward/rearward shifting mechanism 17. The mechanism 17 is constituted from a double pinion type planet gear. When the mechanism 17 is engaged with an advancing clutch 18, the mechanism 17 rotates integrally with the engine 11 at a forward position. When the mechanism 17 is engaged with a retreating brake 19, the mechanism 17 is maintained at a rearward position. The clutch 18 and the brake 19 also serve as a starting mechanism. The power from the mechanism 17 is transmitted to an input shaft 20 of a continuously variable transmission (CVT) 21.

An output shaft 22 of the CVT 21 is connected to a gear type power transmission mechanism 23 constituted by a plurality of gearsets. The mechanism 23 is connected to a differential gear 25 which is provided on an axle 24 with wheels (not shown) mounted thereon. The motor-generator 12 is accommodated in a housing 27 together with the forward/rearward shifting mechanism 17, the CVT 21, the gear type power transmission mechanism 23, and the differential gear 25. The housing 27 is fixed integrally to the engine 11.

The motor-generator 12 is provided with the rotor 13 and a stator 14. The rotor 13 is constituted by a rotor core that rotates integrally with the crankshaft 11a. A rotor wire 31 is wound about the rotor core. The stator 14 is constituted by a stator core fixed to the housing 27. A stator wire 33 is wound about the stator core. An oil pump 26 is provided between the motor-generator 12 and the CVT 21. The oil pump 26 is connected to and driven by the input shaft 16.

A voltage having a predetermined frequency is applied to the stator wire 33 of the motor-generator 12 to produce a rotary magnetic field which frequency is advanced with respect to the rotating speed of the crankshaft 11a. This causes the motor-generator 21 to function as a motor. The rotational drive force of the motor-generator 12, produced from electric power, applies a force to start the engine 11. When the vehicle is traveling, the motor-generator 12 adds accelerating force to the engine 11.

Alternatively, when a voltage of a different frequency is applied to the stator wire 33, the motor-generator 12 produces a rotary magnetic field, the frequency of which is delayed with respect to the rotating speed of the rotary shaft. This causes the motor-generator 12 to function as a generator.

The CVT 21 is constituted by a primary pulley 37 provided on an input shaft 20, a secondary pulley 38 provided on the output shaft 22, and a belt 39. The effective pitch diameter of the pulleys 37, 38 are variable.

The primary pulley 37 includes a fixed plate 40, which is fixed to the input shaft 20, and a movable plate 41, which is slidably coupled to the input shaft 20. Both plates 40, 41 are conical and are arranged opposed to each other in a manner such that they define a V-groove 42. The effective pitch diameter of the primary pulley 37 becomes large as the movable plate 41 approaches the fixed plate 40 and becomes smaller as the movable plate 41 moves away from the fixed plate 40.

The secondary pulley 38 includes a fixed plate 43, which is fixed to the output shaft 22, and a movable plate 44, which is slidably coupled to the output shaft 22. Both plates 43, 44 are conical and are arranged opposed to each other in a manner that they define a V-groove 45. The effective pitch diameter of the secondary pulley 38 becomes large as the movable plate 44 approaches the fixed plate 43 and becomes smaller as the movable plate 44 moves away from the fixed plate 43.

Hydraulic cylinders 46, 47 are provided behind the movable plates 41, 44 of the pulleys 37, 38, respectively, to slide the movable plates 41, 44. Both hydraulic cylinders 46, 47 are connected to a shift control valve 58 (FIG. 2) which controls hydraulic pressure.

When hydraulic oil is supplied to the hydraulic cylinder 46 of the primary pulley 37, the movable plate 41 slides along the shaft 20 toward the fixed plate 41 and increases the effective pitch diameter of the primary pulley 37. The effective pitch diameter of the secondary pulley 38 simultaneously becomes smaller. Accordingly, the gear ratio of the CVT 21 is altered to the accelerating side. Contrarily, the effective pitch diameter of the primary pulley 37 becomes small and the effective pitch diameter of the secondary pulley 38 becomes large when hydraulic oil is discharged from the hydraulic cylinder 46. Accordingly, the gear ratio of the CVT 21 is altered to the decelerating side. Hydraulic oil is constantly supplied to the hydraulic cylinder 47 of the secondary pulley 38 to maintain the tension of the belt 39 adjusted at an appropriate level in accordance with the transmission torque.

Figure 2:
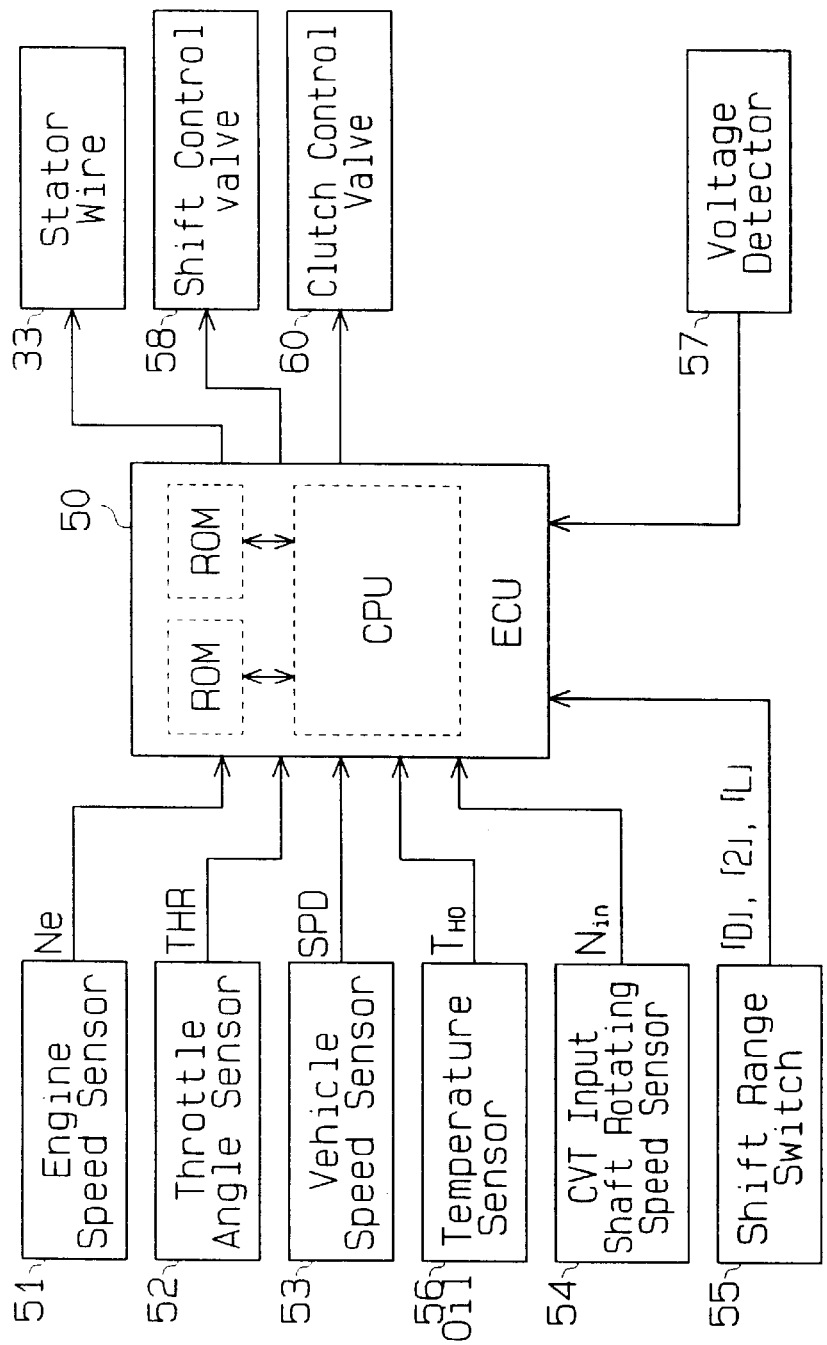
FIG. 2 is an electric block diagram of the power transmission system.

The electric structure of the control system will now be described with reference to FIG. 2.

A rotating speed sensor 51, a throttle angle sensor 52, and a vehicle speed sensor 53 are connected to an electronic control unit (ECU) 50. The rotating speed sensor 51 detects the rotary speed Ne of the engine crankshaft 11a. The throttle angle sensor 52 detects the throttle angle THR of the engine 11. The vehicle speed sensor 53 detects the vehicle speed SPD. An input shaft rotating speed sensor 54, a shift range switch 55, and an oil temperature sensor 56 are also connected to the ECU 50. The input shaft rotating speed sensor 54 detects the rotating speed (actual rotating speed) $N_{in}$ of the input shaft 20. The shift range switch 55 detects the gear position. The oil temperature sensor 56 serves as an oil detecting means that detects the temperature (oil temperature) $T_{HO}$ of the hydraulic oil in the CVT 21.

When the motor-generator 12 is started, a battery (electric power source) supplies electricity to the motor-generator 12 so that the motor-generator 12 functions as an electric motor. When the motor-generator 12 is not being started, a condenser having a large capacity is used as an electric power source to have the motor-generator function as an electric motor.

The ECU 50 controls the energized state of the stator wire 33 when the motor-generator 12 is started. More particularly, the ECU 50 applies a predetermined frequency voltage to the stator wire 33 when an ignition switch (not shown) sends an ON signal to the ECU 50. This causes the motor-generator 12 to function as an electric motor. Consequently, the input casing 15a of the damper 15 is rotated by the drive torque produced by the rotor 13. This rotates the engine crankshaft 11a and starts the engine 11. The ignition switch is maneuvered to an OFF position after the engine 11 is started. This results in the ECU 50 receiving an OFF signal. The ECU 50 then stops energizing the stator wire 33 and causes the motor-generator 12 to enter a generating mode (regeneration mode).

When the motor-generator 12 is not being started, the ECU 50 drives the motor-generator 12 as an electric motor based on detecting signals sent from various sensors and a control program instead of the ON signal sent from the ignition switch.

When the motor-generator 12 is operated in the regeneration mode, a predetermined frequency voltage is applied to the stator wire 33 to produce a rotary magnetic field, the frequency of which is delayed with respect to the rotating speed of the crankshaft 11a. This causes the motor-generator 12 to function as a generator. The consumed drive torque and generated electric power of the motor-generator 12 varies with respect to the engine rotating speed Ne in accordance with the value of a controlling electric current flowing through the stator wire 33. In other words, the greater the value of the controlling electric current is, the greater the generated electric power becomes. The drive torque (engine torque) consumed to obtain the generated electric power also becomes large.

The ECU 50 reads the signals sent from various sensors connected thereto and controls the motor-generator 12 based on the signals and various control programs stored in an incorporated ROM. This enables the motor-generator 12 to function as a motor by performing regeneration controlling or to function as a generator by performing assist controlling. The ROM also stores various maps that are used to process routines in various programs.

During performance of assist controlling and regeneration controlling, the electric power source of the motor-generator 12 is switched from the battery to the condenser (not shown). Accordingly, a voltage detector 57, which detects the capacitor voltage V of the condenser, is connected to the ECU 50.

The ECU 50 controls the shift control valve 58 to actuate the CVT 21. The gear ratio of the CVT 21 is controlled by feedback control. For example, a target rotating speed $N_{ino}$ is set based on the throttle angle THR and the vehicle speed SPD. The actual rotating speed $N_{in}$ is feedback controlled so that it is set as the target rotating speed $N_{ino}$. The ECU 50 also controls a clutch control valve 60 during clutch controlling in an optimum manner.

The processing performed by the ECU 50 after the starting of the engine 11 will now be described with reference to FIGS. 8 to 15.

Figure 9:
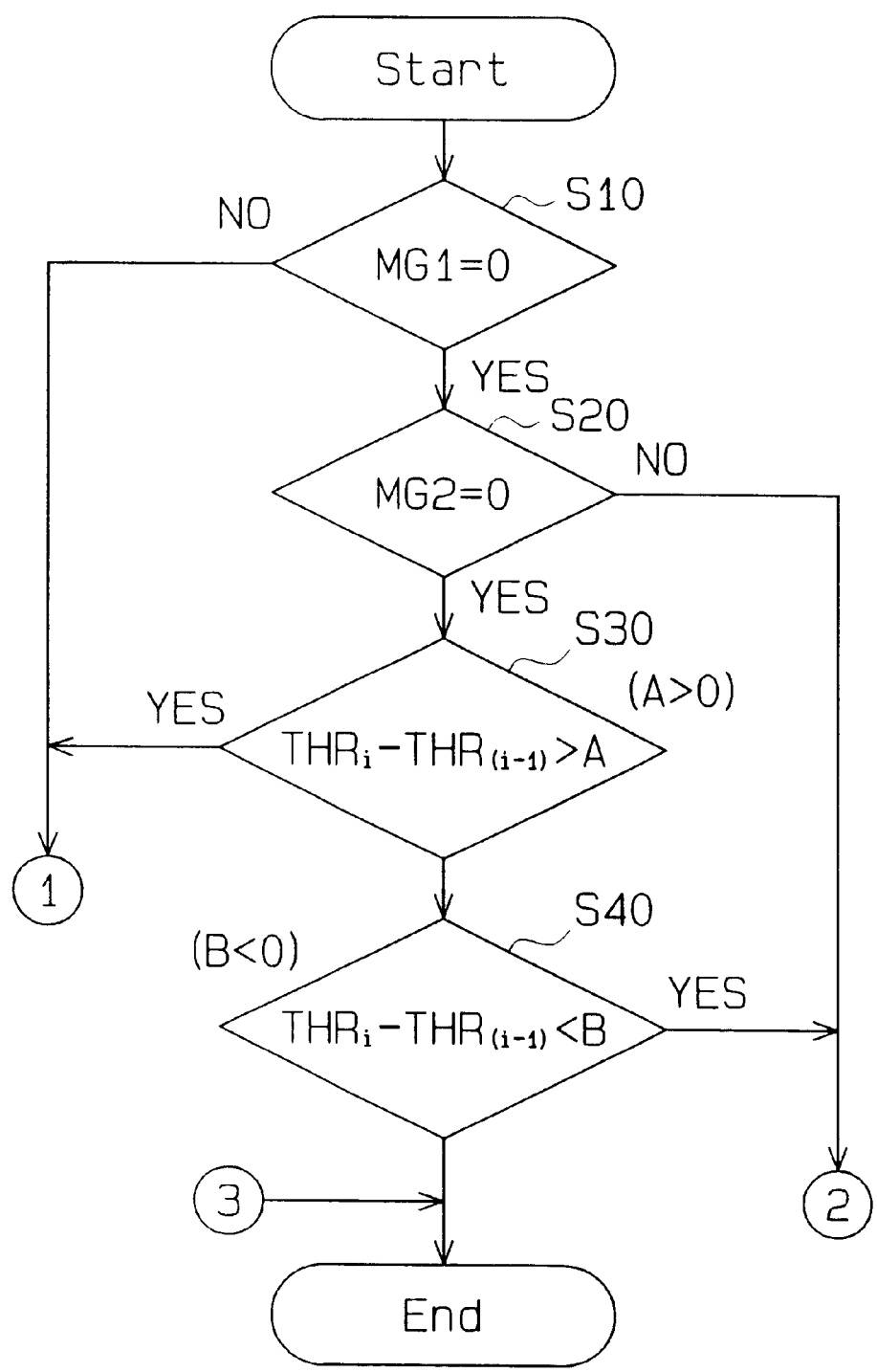
FIG. 9 is a flowchart illustrating assist controlling and regeneration controlling of the motor-generator.
Figure 10:
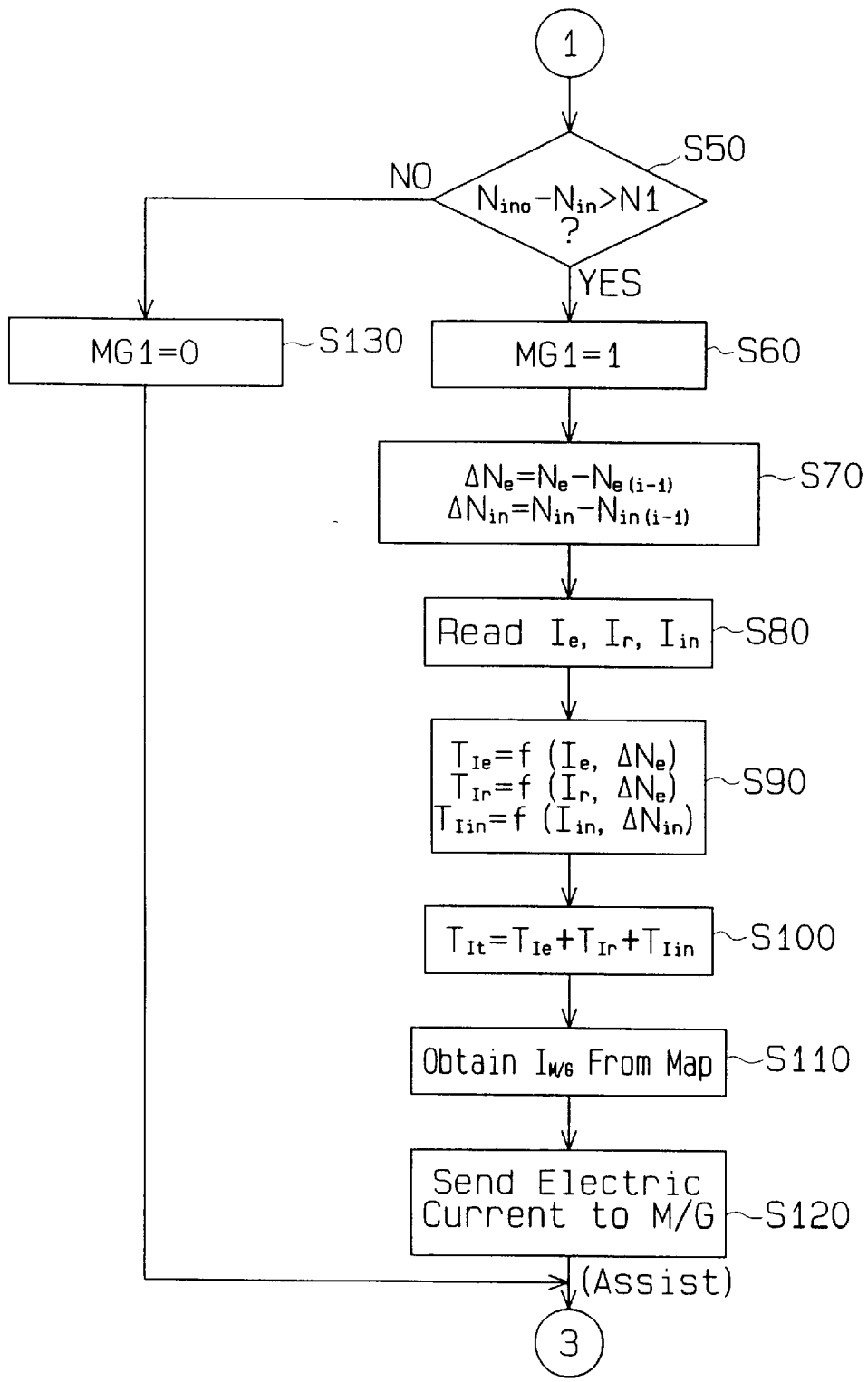
FIG. 10 is a flowchart illustrating assist controlling and regeneration controlling of the motor-generator.
Figure 11:
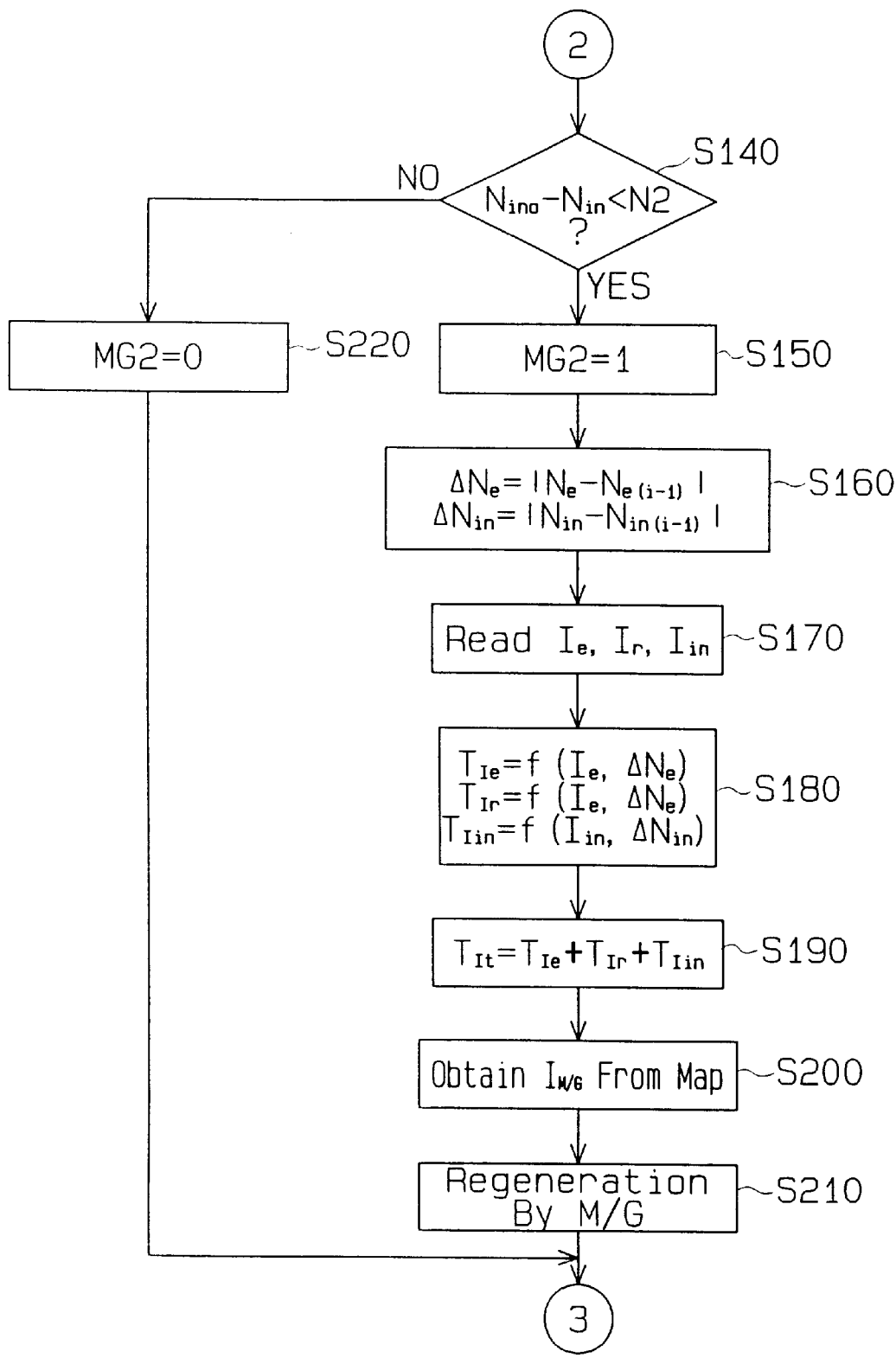
FIG. 11 is a flowchart illustrating assist controlling and regeneration controlling of the motor-generator.

FIGS. 9 to 11 illustrate a flowchart of a routine that is executed by the ECU 50 to perform assist controlling and regeneration controlling of the motor-generator 12. Periodic interrupting is carried out every predetermined time period to execute the routine. When the ECU 50 enters the routine, the ECU 50 judges whether an assist flag MG1 is set at zero in step S10. Since the assist flag MG1 is initially set at zero, the ECU 50 proceeds to step S20. At step S20, the ECU 50 judges whether the regeneration flag MG2 is set at zero. Since the regeneration flag MG2 is initially set at zero, the ECU 50 proceeds to S30.

At step S30, the ECU 50 judges whether the difference between the throttle angle $THR_i$ and the throttle angle $THR_{(i-1)}$ in the previous cycle exceeds a predetermined reference value A (A>0). If the difference between the throttle angles exceeds the reference value A, this indicates an accelerating state. If the difference is below the reference value A, this indicates that accelerating is not taking place. When an accelerating state is confirmed, the ECU 50 proceeds to step S50. When it is determined that accelerating is not taking place, the ECU 50 proceeds to step S40. At step S40, the ECU 50 judges whether the difference between the throttle angle $THR_i$ and the throttle angle $THR_{(i-1)}$ in the previously cycle is lower than a predetermined reference value B (B<0). If the difference between the throttle angles is lower than the reference value B, this indicates a decelerating state. In this case, the ECU 50 proceeds to step S140. If the difference exceeds the reference value B, the ECU 50 determines that decelerating is not taking place. In this case, the ECU 50 terminates execution of the routine.

If the assist flag MG1 is determined to be set at one in step S10 or if an accelerating state is confirmed at step S30, the ECU 50 proceeds to step S50 and judges whether the difference between the target rotating speed $N_{ino}$ and the actual rotating speed $N_{in}$ exceeds a predetermined reference value N1 (N1>0). This is to judge whether the down shifting of the CVT 21 has been completed.

FIG. 4(a) illustrates a time chart of the target rotating speed $N_{ino}$ and the actual rotating speed $N_{in}$. It is apparent from FIG. 4 that there is a delay in the actual rotating speed $N_{in}$ with respect to the target rotating speed $N_{ino}$. Accordingly, the ECU 50 determines that the shifting has been completed in the case that the difference between the target rotating speed $N_{ino}$ and the actual rotating speed $N_{in}$ is smaller than the reference value N1. The target rotating speed $N_{ino}$ is computed from the throttle angle THR and the vehicle speed SPD. When the difference between the target rotating speed $N_{ino}$ and the actual rotating speed $N_{in}$ exceeds the reference value N1, the ECU 50 determines that shifting is being performed. In this case, the ECU 50 proceeds to step S60 and sets the assist flag MG1 to one.

At step S70, the difference $\Delta N_e$ (altering speed) between the engine speed $N_e$ and the engine speed $N_{e(i-1)}$ of the previous cycle is computed. The difference $\Delta N_e$ corresponds to a rotating speed altering rate. In the same step, the difference $\Delta N_{in}$ (altering speed) between the actual rotating speed $N_{in}$ of the CVT 21 and the actual rotating speed $N_{in(i-1)}$ of the CVT 21 is also computed. The difference $\Delta N_{in}$ corresponds to a rotating speed altering rate. The ECU 50 then proceeds to step S80 and reads the engine's moment of inertia $I_e$, the motor-generator rotor's moment of inertia $I_x$, and the CVT input shaft's moment of inertia $I_{in}$, which are stored in the ROM (not shown). These values are either obtained through experiments or are theoretical values.

At step S90, the ECU 50 computes the inertia torque. In other words, the inertia torque $T_{Ie}$ of the engine 11 is obtained through a function $f(I_e, \Delta N_e)$. The function f corresponds to the equation of $f(I_e, \Delta N_e)=I_e \times K \times \Delta N_e$. K represents a constant related to the controlling cycle. In the same manner, the inertia torque $T_{Ir}$ of the motor-generator 12 and the inertia torque $T_{Iin}$ of the CVT 21 are respectively obtained from the functions $f(I_x, \Delta N_e)$ and $f(I_{in}, \Delta N_{in})$. When the advancing clutch 18 is completely engaged, the engine crankshaft 11a and the input shaft 20 of the CVT 21 rotate integrally. Thus, the engine speed $N_e$ coincides with the actual rotating speed $N_{in}$ of the input shaft 20. In this case, the inertia torque $T_{Iin}$ of the CVT 21 is obtained from the function $f(I_{in}, \Delta N_e)$. The ECU 50 then proceeds to step S100 and computes the total inertia torque $T_{It}$. This computation is obtained from the equation of $T_{It}=T_{Ie}+T_{Ir}+T_{Iin}$.

At step S110, the controlling electric current value $I_{M/G}$ of the motor-generator 12 is obtained through a map stored in the ROM. As shown in FIG. 3, the map is three-dimensional and includes the engine speed $N_e$, the inertia torque $T_{It}$, and the controlling electric current value $I_n$. These values are obtained through experiments. As shown in the map of FIG. 3, the controlling electric current value $I_{M/G}$, which corresponds to the inertia torque $T_{It}$ and the engine speed $N_e$, is selected from $I_1, I_2, I_3$, etc. ($I_1 > I_2 > I_3 > I_n$, n=4, 5, 6, . . . ). The ECU 50 then proceeds to step S120 and sends a controlling electric current value $I_{M/G}$, computed in step S110, to the motor-generator (M/G) 12 and performs assist controlling of the motor-generator 12. In other words, the motor-generator 12 is driven as an electric motor by a power corresponding to the torque $T_{It}$. The routine is terminated after execution of step S120.

When the difference between the target rotating speed $N_{ino}$ and the actual rotating speed $N_{in}$ of the input shaft 20 is lower than the reference value N1 in step S50, the ECU 50 determines that shifting has been completed and proceeds to step S130 to reset the assist flag MG1 to zero. The ECU 50 also stops performing assist controlling and terminates execution of the routine.

When the assist flag MG2 is set at one in step S20 or when decelerating is confirmed in step S40, the ECU 50 proceeds to step S140 and judges whether the difference between the target rotating speed $N_{ino}$ and the actual rotating speed $N_{in}$ is lower than a reference value N2(N2<0). In other words, the CVT 21 is up shifted when decelerating. Thus, the ECU 50 judges whether the shifting has been completed. FIG. 4(a) illustrates the time chart of the target rotating speed $N_{ino}$ and the actual rotating speed $N_{in}$. It is apparent from FIG. 4 that there is a delay in the actual rotating speed $N_{in}$ with respect to the target rotating speed $N_{ino}$. Accordingly, the ECU 50 determines that the shifting has been completed in the case that the difference between the target rotating speed $N_{ino}$ and the actual rotating speed $N_{in}$ exceeds the reference value N2. When the difference between the target rotating speed $N_{ino}$ and the actual rotating speed $N_{in}$ is lower than the reference value N2, the ECU 50 determines that the CVT 21 is still shifting and proceeds to step S150 to set the regeneration flag MG2 to one.

At step 160, the absolute value of the difference $\Delta N_e$ (altering speed) between the engine speed $N_e$ and the engine speed $N_{e(i-1)}$ of the previous cycle is computed. The difference $\Delta N_e$ corresponds to the rotating speed altering rate. The absolute value of the difference $\Delta N_{in}$ (altering speed) between the actual rotating speed $N_{in}$ of the CVT 21 and the actual rotating speed $N_{in(i-1)}$ of the CVT 21 in the previous cycle is computed. Step S160 serves as a second detecting means. The ECU 50 then proceeds to step 170 and reads the engine's moment of inertia $I_e$, the motor-generator rotor's moment of inertia $I_r$, and the CVT input shaft's moment of inertia $I_{in}$, which are stored in a ROM.

At step S180, the ECU 50 computes the inertia torque. The ECU 50 obtains the inertia torque $T_{Ie}$ of the engine 11 through the function $f(I_e, \Delta N_e)$. The function f corresponds to the equation of $f(I_e, \Delta N_e)=I_e \times K \times \Delta N_e$. K represents a constant related to the controlling cycle. In the same manner, the inertia torque $T_{Ir}$ of the motor-generator 12 and the inertia torque $T_{Iin}$ of the CVT 21 are respectively obtained from the function $f(I_r, \Delta N_e)$ and the function $f(I_{in}, \Delta N_{in})$. When the advancing clutch 18 is completely engaged, the engine crankshaft 11a and the input shaft 20 of the CVT 21 rotate integrally. Thus, the engine speed $N_e$ coincides with the actual rotating speed $N_{in}$ of the input shaft 20. In this case, the inertia torque $T_{Iin}$ of the CVT 21 is obtained from the function $f(I_{in}, \Delta N_e)$. The ECU 50 then proceeds to step S190 and computes the total inertia torque $T_{It}$. This computation is obtained from the equation of $T_{It}=T_{Ie}+T_{Ir}+T_{Iin}$.

At step S200, the controlling electric current value $I_{M/G}$ of the motor-generator 12 is obtained through a map stored in the ROM. As shown in FIG. 3, the map is three-dimensional and consists of the engine speed $N_e$, the inertia torque $T_{It}$, and the controlling electric current value $I_n$. These values are obtained through experiments. As shown in the map of FIG. 3, the controlling electric current value $I_{M/G}$, which corresponds to the inertia torque $T_{It}$ and the engine speed $N_e$ is selected from $I_{101}, I_{102}, I_{103}$, etc. ($I_{101}<I_{102}<I_{103}<I_m$, m=104, 105, 106, . . . ). The ECU 50 then proceeds to step S210 and sends a controlling electric current value $I_{M/G}$, obtained in step S200, to the motor-generator 12 (stator wire 33) and performs regeneration controlling of the motor-generator 12. In other words, the motor-generator 12 serves as a generator and regenerates electric current and also charges the condenser (not shown). The regeneration controlling enables electric power to be obtained. However, drive torque is consumed to obtain the electric power. The routine is terminated after execution of step S210.

When the difference between the target rotating speed $N_{ino}$ and the actual rotating speed $N_{in}$ exceeds the reference value N2 in step S140, the ECU 50 determines that the shifting has been completed and proceeds to step S220 to reset the regeneration flag MG2 to zero. The ECU 50 also stops performing assist controlling and terminates execution of the routine.

At steps S70 to S120, the decrease in the level of the inertia torque, which is caused by an increase in rotating speed due to the engine's moment of inertia $I_e$, the motor-generator rotor's moment of inertia $I_r$, and the CVT input shaft's moment of inertia $I_{in}$, is computed. The computed decrease in torque is replenished by the motor-generator 12. As a result, a torque decrease is prevented since the motor-generator 12 compensates (assists) the torque decrease caused by inertia. The area indicated by slanted lines between a line representing controlling of the motor-generator (M/G) and a line representing non-controlling of the motor-generator (M/G) in FIG. 4(b) illustrates an assist area, or the compensated torque decrease.

At steps S160 to S210, the input system inertia torque during a decrease in rotating speed due to the engine's moment of inertia $I_e$, the motor-generator rotor's moment of inertia $I_r$, and the CVT input shaft's moment of inertia $I_{in}$ is computed. The motor-generator 12 regenerates electric power that corresponds to the computed torque decrease. As a result, torque shocks that are produced during up shifting are reduced by regenerating the input shaft inertia torque with the motor-generator 12. The area indicated by slanted lines between the line representing controlling of the motor-generator (M/G) and the line representing non-controlling of the motor-generator (M/G) in FIG. 4(b) illustrates a regeneration area, or the compensated torque decrease.

Furthermore, at step S50, the ECU 50 determines that the acceleration of the CVT 21 has been completed when the difference between the target rotating speed $N_{ino}$ and the actual rotating speed $N_{in}$ of the CVT 21 is lower than the reference value N1. The torque assist of the motor-generator 12 is terminated at the point of time when the acceleration is stopped. This coincides the torque assist completion timing of the CVT 21 and the motor-generator 12. As a result, the fluctuation of the drive force is reduced.

In addition, at step S140, the ECU 50 determines that the deceleration of the CVT 21 has been completed when the difference between the target rotating speed $N_{ino}$ and the actual rotating speed Nin of the CVT 21 exceeds the reference value N1. The regeneration controlling of the motor-generator 12 is terminated at the point of time when the deceleration is stopped. This coincides the regeneration controlling completion timing of the CVT 21 and the motor-generator 12. As a result, the fluctuation of the drive force is reduced.

Figure 12:
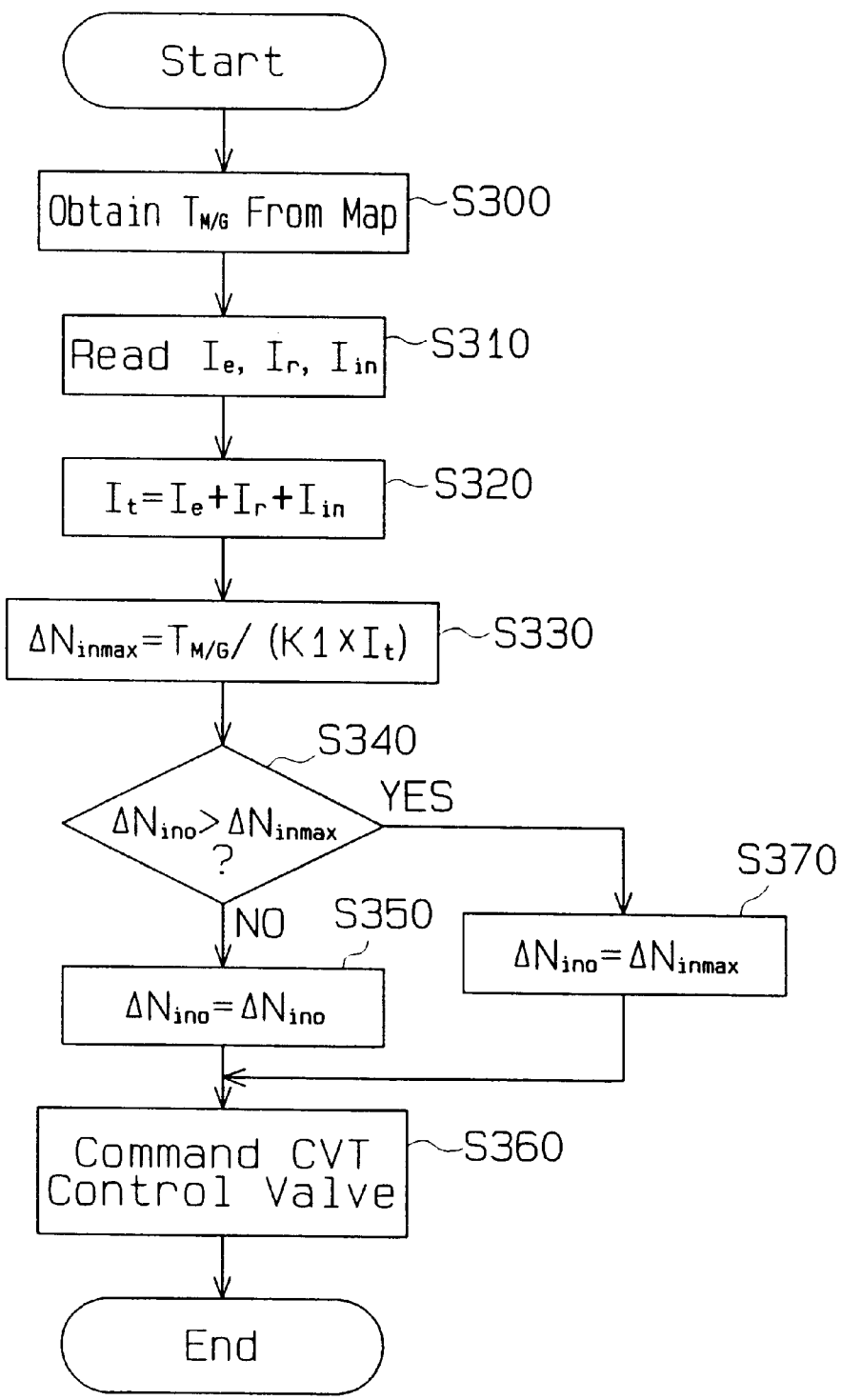
FIG. 12 is a flowchart showing a CVT shift restricting routine.

A routine employed to restrict the shifting of the CVT 21 will now be described with reference to FIG. 12. Periodic interrupting is carried out every predetermined time period to execute the routine. When the ECU 50 proceeds to this routine in step 300, the assist torque maximum value $T_{M/G}$ of the motor-generator 12 is obtained through a map stored in the ROM. The map is three-dimensional and consists of the engine speed $N_e$, the capacitor voltage V, and the assist torque maximum value $T_{M/G}$. These values are obtained through experiments. In other words, the controlling electric current value that may be supplied to the motor-generator 12 is obtained from the capacitor voltage V. Thus, the assist torque maximum value $T_{M/G}$ is obtained from the capacitor voltage V and the engine speed $N_e$.

The reason for monitoring the capacitor voltage V, that is, the reason for obtaining the assist torque maximum value $T_{M/G}$ is as follows. When assist controlling of the motor-generator 12 is performed, its electric power source is a large-capacity condenser (not shown). When regeneration controlling of the motor-generator 12 is performed, its generated electric power charges the condenser. Accordingly, the capacitor voltage of the condenser is not maintained at a constant value due to the difference in the frequency in the execution of the assist controlling and the regeneration controlling. Thus, depending on the capacitor voltage, compensation of the assist area shown in FIG. 4(b) may become impossible. Thus, monitoring the capacitor voltage V and obtaining the assist torque maximum value $T_{M/G}$ is extremely effective.

At step S310, the ECU 50 reads the engine's moment of inertia $I_e$, the motor-generator rotor's moment of inertia $I_r$, and the CVT input shaft's moment of inertia $I_{in}$ which are stored in the ROM. At step S320, the ECU 50 computes the total value $I_t$ of these moment of inertias. The ECU 50 then proceeds to step S330 and computes the input shaft maximum rotating speed altering rate $\Delta N_{inmax}$, which corresponds to the maximum shifting speed of the input shaft 20 of the CVT 21. The altering rate $\Delta N_{inmax}$ is obtained by dividing the assist torque maximum value $T_{M/G}$ with a multiplied value calculated from the formula of constant K1×moment of inertia total value It.

The ECU 50 then proceeds to step S340 and judges whether the maximum rotating speed altering rate $\Delta N_{inmax}$ is smaller than the target rotating speed altering rate $\Delta N_{ino}$. The target rotating speed altering rate $\Delta N_{ino}$ is a differential value of the target input shaft rotating speed $N_{ino}$ under each corresponding condition and is obtained through a different routine. When it is determined that the maximum rotating speed altering rate $\Delta N_{inmax}$ is greater than the target rotating speed altering rate $\Delta N_{ino}$ in step S340, the ECU 50 proceeds to step S350 and sets the target rotating speed altering rate $\Delta N_{ino}$ as the target rotating speed altering rate $\Delta N_{ino}$ for controlling the CVT 21. When it is determined that the maximum rotating speed altering rate $\Delta N_{inmax}$ is smaller than the target rotating speed altering rate $\Delta N_{ino}$ in step S340, the ECU 50 proceeds to step S370 and sets the maximum rotating speed altering rate $\Delta N_{inmax}$ as the target rotating speed altering rate $\Delta N_{ino}$ for controlling the CVT 21. At step 360, the ECU 50 controls the shift control valve 58 of the CVT 21 in accordance with the target rotating speed altering rate $\Delta N_{ino}$, which is set in either step S350 or step S370.

At step 340, when the maximum rotating speed altering rate $\Delta N_{inmax}$ is smaller than the target rotating speed altering rate $\Delta N_{ino}$, the ECU 50 proceeds to step S370 and sets the maximum rotating speed altering rate $\Delta N_{inmax}$ as the target rotating speed altering rate $\Delta N_{ino}$ for controlling the CVT 21. This is carried out due to the reasons described below.

If the target rotating speed altering rate $\Delta N_{ino}$ is greater than the maximum rotating speed altering rate $\Delta N_{inmax}$, setting the maximum rotating speed altering rate $\Delta N_{inmax}$ as the target rotating speed altering rate $\Delta N_{ino}$ allows reduction in the inclination (increasing rate) of the onset of $N_{ino}$, shown in FIG. 4(a), and applies a guard. As a result, the inclination of the output torque during controlling of the motor-generator 12 that is shown in FIG. 4(b) is reduced. This leads to a reduction of the assist area. If the target rotating speed altering rate $\Delta N_{ino}$ is greater than the maximum rotating speed altering rate $\Delta N_{inmax}$, and this high target rotating speed altering rate $\Delta N_{ino}$ is to be used as the target value, the inclination (increasing rate) of the onset of $N_{ino}$, shown in FIG. 4(a), would be increased. This results in an increase in the inclination of the output torque during controlling of the motor-generator 12. Thus, the assist area is increased and assist by the motor-generator 12 becomes impossible.

Accordingly, by controlling the shifting of the CVT 21 based on the maximum rotating speed altering rare $\Delta N_{inmax}$, assist controlling of the motor-generator 12 may be controlled regardless of the capacitor voltage V becoming low. This prevents the output torque from decreasing and improves drivability.

Figure 13:
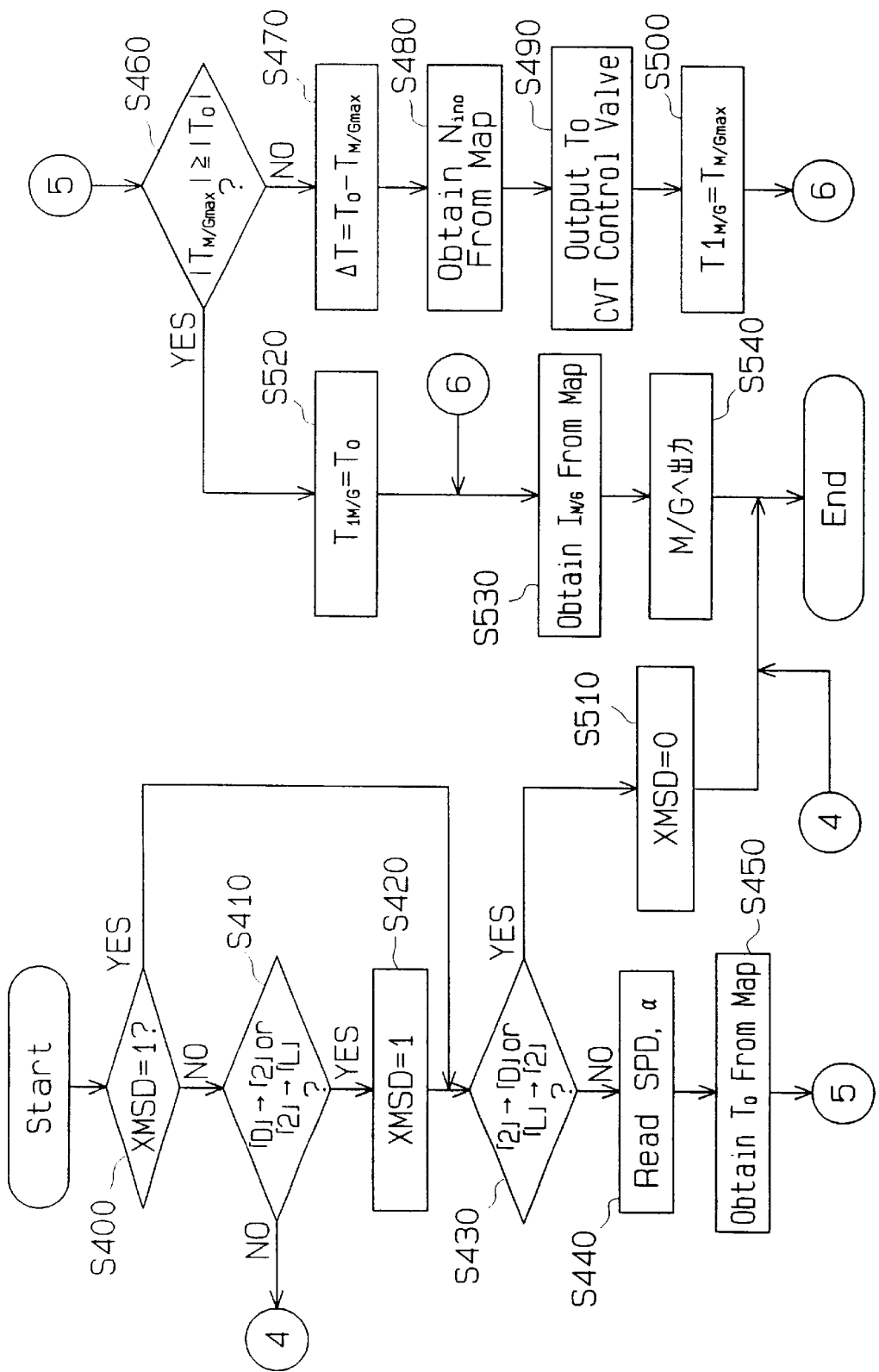
FIG. 13 is a flowchart of the regeneration controlling during manual shift down.

A regeneration controlling routine which is executed by the ECU 50 during manual shift down will now be described with reference to FIG. 13. Periodic interrupting is carried out every predetermined time period to execute the routine.

When the ECU 50 enters this routine, at step S400, the ECU 50 judges whether a manual shift down flag XMSD is set at one. If the manual shift down flag XMSD is set at one, the ECU 50 determines that manual shift down had been carried out in the previous cycle and proceeds to step S430. At step S430, the ECU 50 judges whether the gear is being manually shifted up from a second range (2) to a drive range (D) or from a low range (L) to the second range (2). If it is determined that manual shift up is taking place, the ECU 50 proceeds to step S510 and resets the manual shift down flag XMSD to zero. The ECU 50 then terminates the routine.

If the flag XMSD is set at zero in step S400, the ECU 50 determines that manual shift down had not been carried out in the previous cycle and proceeds to step S410. The manual shift down flag XMSD is initially reset at zero. At step S410, the ECU 50 judges whether the gear is being manually shifted down from the drive range (D) to the second range (2) or from the second range (2) to the low range (L). The shifting is confirmed based on various signals sent from the shift range switch 55 when the gear is shifted to the drive, second, or low range. The ECU 50 compares the data of the signals from the shift range switch 55 in the previous cycle with the data of the signals from the switch 55 in the present cycle to determine whether a shift down has taken place. If a shift down has not taken place, the ECU 50 stops execution of this routine. Contrarily, if a shift down has been performed, the ECU 50 proceeds to step S420 and sets the manual shift down flag XMSD to one.

At step S430, the ECU 50 determines that manual shift up has not been performed. The ECU 50 then proceeds to step 440 and reads the vehicle speed SPD and an acceleration rate α. The acceleration rate α is computed beforehand through a different routine based on the vehicle speed SPD.

At step S450, the ECU 50 obtains the required negative drive torque $T_o$ through a map. The map is three-dimensional and includes the vehicle speed SPD, the acceleration rate α, and a negative drive torque. The map is obtained through experiments.

In the subsequent step S460, the ECU 50 judges whether the absolute value of the negative drive torque $T_o$ is equal to or smaller than the absolute value of the maximum regeneration torque $T_{M/Gmax}$. The maximum regeneration torque $T_{M/Gmax}$ is obtained through a different routine.

Figure 14:
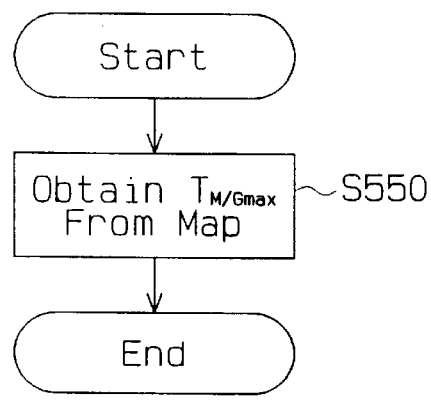
FIG. 14 is a flowchart of a routine for computing the maximum regeneration torque of the motor-generator.

FIG. 14 illustrates a computing routine that is used to obtain the maximum regeneration torque. The computing routine is executed periodically. Before describing the computing routine, the definition of the maximum regeneration torque $T_{M/Gmax}$ will be given. The condenser, which serves as an electric power source when regeneration controlling is performed, has been charged during the prior regeneration controlling and thus has a voltage V. The maximum voltage that may be obtained through the subsequent regeneration controlling is computed from the difference between the maximum capacitor voltage Vmax of the condenser and the charged voltage V of the condenser. Accordingly, the maximum regeneration torque $T_{M/Gmax}$ is obtained from the present condenser voltage V and the corresponding engine speed $N_e$.

Thus, at step S550, shown in FIG. 14, the ECU 50 compares the present condenser voltage V and the corresponding engine speed $N_e$ with a map. The map is three-dimensional and includes the condenser voltage V, the engine speed $N_e$, and the torque. The map is obtained through experiments. The maximum regeneration torque $T_{M/Gmax}$ is obtained from the map. After step 550, the ECU 50 terminates execution of this routine.

Returning to the description of the original routine, if the absolute value of the negative drive torque $T_o$ does not exceed the absolute value of the maximum regeneration torque $T_{M/Gmax}$ of the motor-generator 12 in step S460, the ECU 50 proceeds to step S520. If the absolute value of the negative drive torque To exceeds the absolute value of the maximum regeneration torque $T_{M/Gmax}$ of the motor-generator 12, the ECU 50 proceeds to step S470. At step S470, the ECU 50 computes the difference ΔT between the negative drive torque $T_o$ and the maximum regeneration torque $T_{M/Gmax}$. That is, the negative drive torque ΔT of the CVT 21 is computed in this step. In step 480, the target rotating speed $N_{ino}$ is obtained from a three-dimension map, which includes the negative drive torque ΔT, the vehicle speed SPD, and the input shaft rotating speed $N_{in}$. The map is illustrated in FIG. 5.

Figure 5:
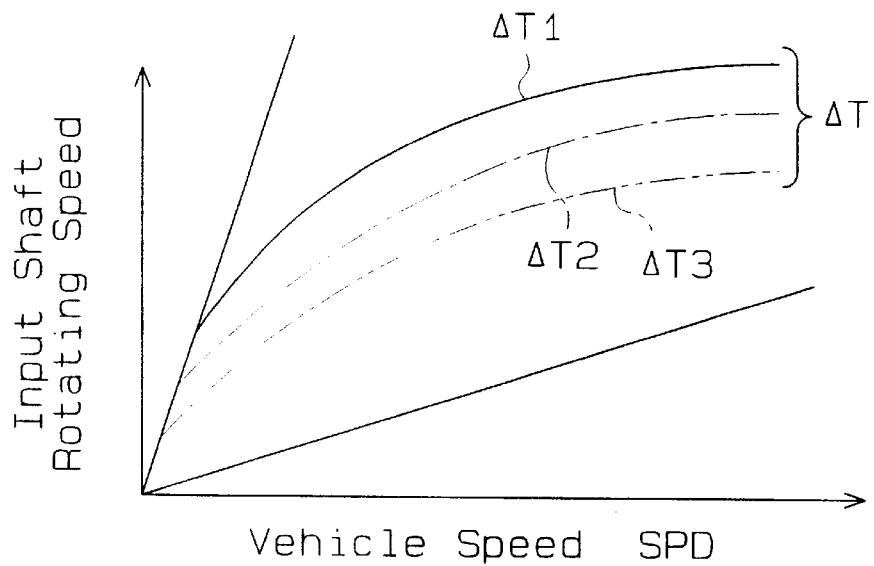
FIG. 5 is a characteristic diagram showing the relationship between the vehicle speed and an actual CVT input shaft rotating speed.
Figure 6:
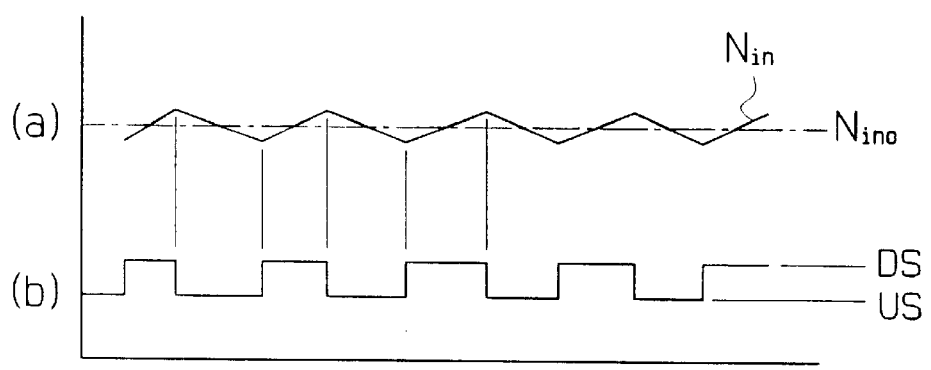
FIG. 6 is a time chart of a CVT shift flag and a CVT input shaft rotating speed in a constant speed state.
Figure 7:
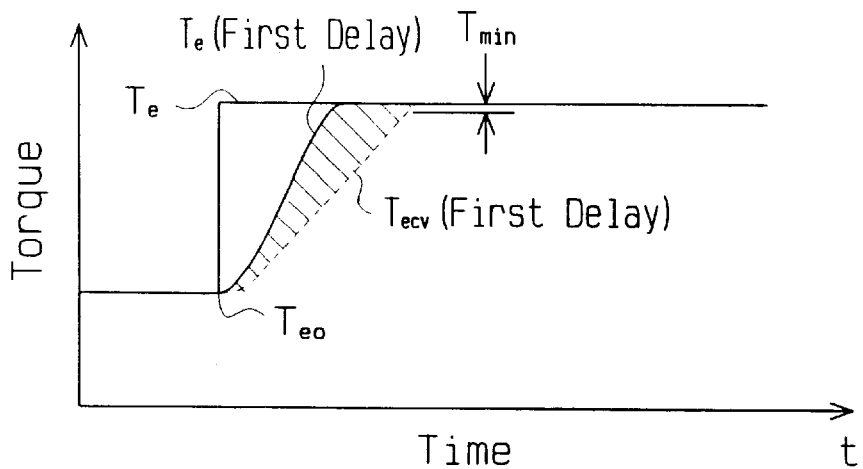
FIG. 7 is a time chart of the engine torque and a CVT input torque.

In the map shown in FIG. 5, the input rotating speed $N_{in}$ alters with respect to the vehicle speed SPD in accordance with the negative drive torque ΔT. In other words, increase of the vehicle speed SPD results in an increase of the input shaft rotating speed $N_{in}$. When the vehicle speed SPD is constant and the negative drive torque ΔT is large, or in the case the expression of ΔT1>ΔT2>ΔT3 is satisfied, the negative torque ΔT1 becomes greater than the negative torque ΔT3 with respect to the input shaft rotating speed $N_{in}$.

At step S490, the ECU 50 controls the shift control valve 58 of the CVT 21 based on the target rotating speed $N_{ino}$, which was set in step S480. At step S500, the maximum regeneration torque $T_{M/Gmax}$ is set as the first target regeneration torque $T1_{M/G}$. At step S530, the controlling electric current $I_{M/G}$ of the motor-generator 12 is obtained from a map stored in the ROM. The map is three-dimensional and includes the engine speed $N_e$, the torque T, and the controlling electric current value $I_n$, which are obtained through experiments. The controlling electric current value $I_{M/G}$ corresponding to the torque T and the engine speed $N_e$ are selected from this map.

At step S540, the ECU 50 sends the controlling electric current value $I_{M/G}$ to the stator wire 33 of the motor-generator 12 and performs regeneration controlling of the motor-generator 12. In other words, the motor-generator 12 functions as a generator and regenerates electric current to charge the condenser. Electric power is obtained through the regeneration controlling. However, negative drive torque is consumed to produce the electric power. After step S540, the ECU 50 stops execution of the routine.

Accordingly, by executing steps S470 to S540, the motor-generator 12 produces the maximum regeneration torque $T_{M/Gmax}$ and controls the shifting of the CVT 21 to replenish the insufficient torque. The negative drive torque $T_o$ is obtained by controlling both the motor-generator 12 and the CVT 21.

At step 460, if the absolute value of the required negative drive torque To is equal to or lower than the absolute value of the maximum regeneration torque $T_{M/Gmax}$ of the motor-generator 12, the ECU 50 proceeds to step S520. At step 520, the ECU 50 sets the negative drive torque as the first target regeneration $T_{1M/G}$ and proceeds to step S530. At step S530, the ECU 50 obtains the controlling electric current value $I_{M/G}$ from the map. At step 540, the controlling electric current value $I_{M/G}$ is sent to the motor-generator 12 (stator wire 33) and regeneration controlling of the motor-generator 12 is performed. The ECU then terminates execution of this routine.

Accordingly, execution of steps S520 to S540 produces the negative drive torque $T_o$ required by the motor-generator 12. Thus, the shifting of the CVT 21 becomes unnecessary.

At step S460, if the absolute value of the required negative drive torque $T_o$ exceeds the absolute value of the maximum regeneration torque $T_{M/Gmax}$ of the motor-generator 12, the ECU 50 carries out steps S470 to S540. Through the steps of S470 to S540, the ECU 50 produces the maximum regeneration torque $T_{M/Gmax}$ and controls shifting of the CVT 21 to replenish the insufficient torque. This suppresses the shift controlling of the CVT 21 and prevents the belt of the CVT 21 from slipping.

Figure 15:
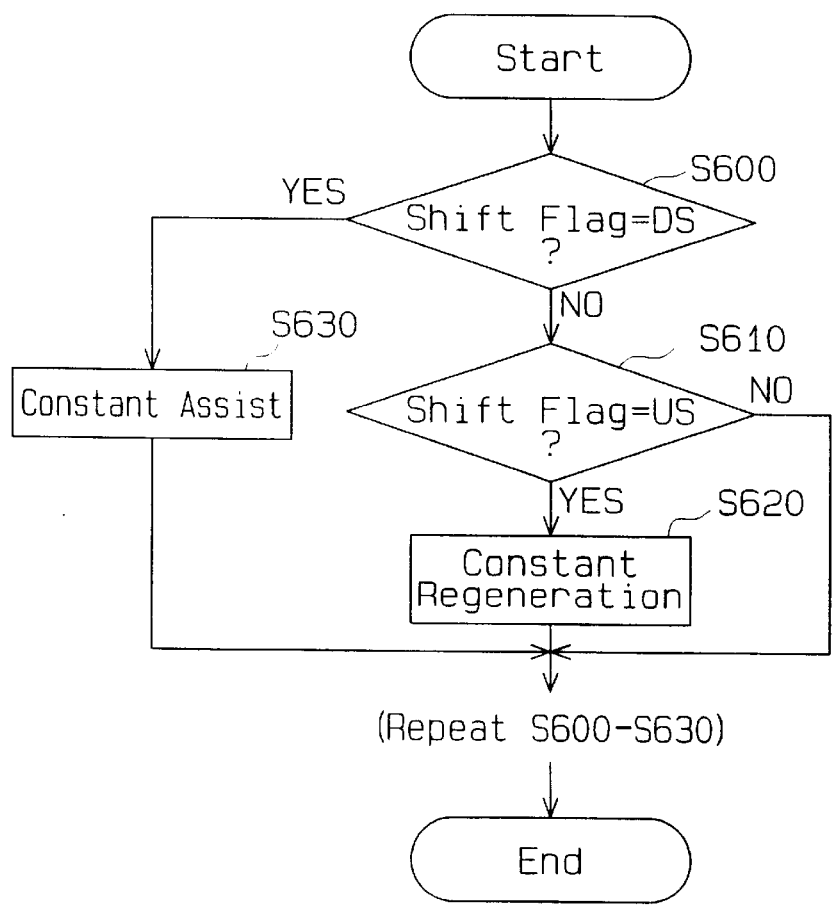
FIG. 15 is a flowchart of a control routine executed when the CVT is in a constant speed state.

A control routine executed by the ECU 50 is shown in FIG. 15. The routine is performed when the CVT 21 is in a state that its speed is constant. The controlling of the CVT 21 will first be described.

The ECU 50 controls the altering of the gear ratio of the CVT 21 based on shift flags that correspond to each shift state. Shift flag DF corresponds to sudden deceleration, shift flag DM corresponds to normal deceleration, shift flag DS corresponds to gradual deceleration, shift flag US corresponds to gradual acceleration, shift flag UM corresponds to normal acceleration, and shift flag UF corresponds to sudden acceleration. The ECU 50 sets these shift flags based on input signals. The CVT 21 is controlled based on the set shift flag. When the speed is constant and shifting is not performed, the ECU 50 alternately sets the shift flag DS and the shift flag US. This controls the CVT 21 to repetitively perform gradual deceleration and gradual acceleration as shown in FIG. 6(b). By repeating acceleration and deceleration, the actual rotating speed $N_{in}$ fluctuates repetitively in a cyclic manner about the target rotating speed $N_{ino}$. This controls the gear ratio so that it becomes substantially constant.

Periodic interrupting is carried out every predetermined time period to execute the routine illustrated in FIG. 15. When the ECU 50 enters this routine, the ECU 50 determines whether the shift flag DS is set. If the shift flag DS is set, the ECU 50 proceeds to step S630 and performs assist controlling of the motor-generator 12 by sending the predetermined controlling electric current value $I_{M/G}$ to the motor-generator 12. In other words, the motor-generator 12 functions as a motor and produces a predetermined torque T. The predetermined controlling electric current value $I_{M/G}$ is a value prestored in the ROM. The value corresponds to the torque required for assist when gradual deceleration is executed while in a constant speed state.

If the shift flag DS is not set at step S600, the ECU 50 proceeds to step S610 and judges whether the shift flag US is set. At step S610, if it is determined that the shift flag US is not set, the ECU 50 stops executing this routine. If it is determined that the shift flag US is set in step S610, the ECU 50 proceeds to step S620. At step S620, constant regeneration controlling of the motor-generator 12 is performed by sending the controlling electric current value $I_{M/G}$ to the stator wire 33 of the motor-generator 12.

In other words, the motor-generator 12 functions as a generator and regenerates electric power to charge the condenser. By performing the regeneration controlling, electric power is produced. However, drive torque is consumed to produce the electric power. The predetermined controlled electric value $I_{M/G}$ for the regeneration controlling corresponds to the value prestored in the ROM. The torque consumed when performing regeneration controlling during execution of gradual acceleration in a constant speed state is obtained through experiments.

In this routine, execution of steps S600 to S630 results in constant assist controlling of the motor-generator 12 being performed during gradual deceleration and constant regeneration controlling of the motor-generator 12 being performed during gradual acceleration. The constant assist controlling and the constant regeneration controlling are performed regardless of the cyclic fluctuation of the actual rotating speed $N_{in}$ of the CVT 21 due to gradual deceleration and gradual acceleration being carried out repetitively. Thus, the torque fluctuation produced when switching between gradual acceleration and gradual deceleration is suppressed.

Figure 8:
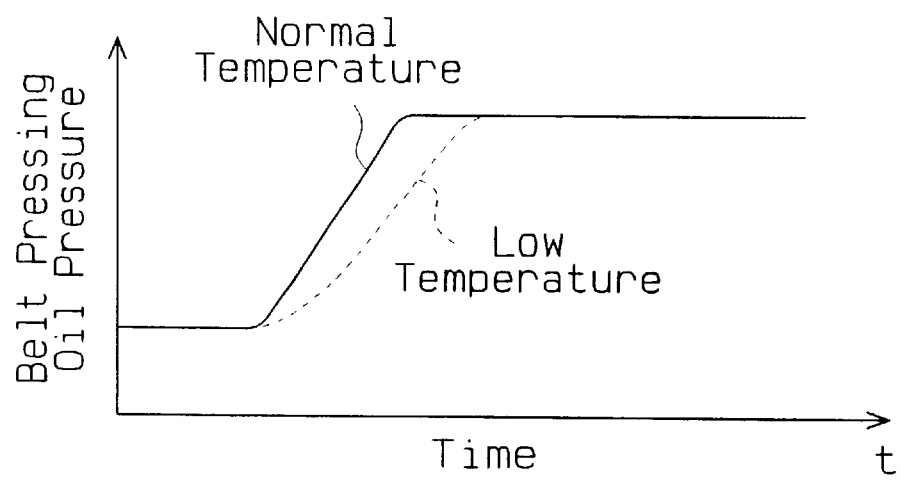
FIG. 8 is a time chart of a belt pressing hydraulic pressure.
Figure 16:
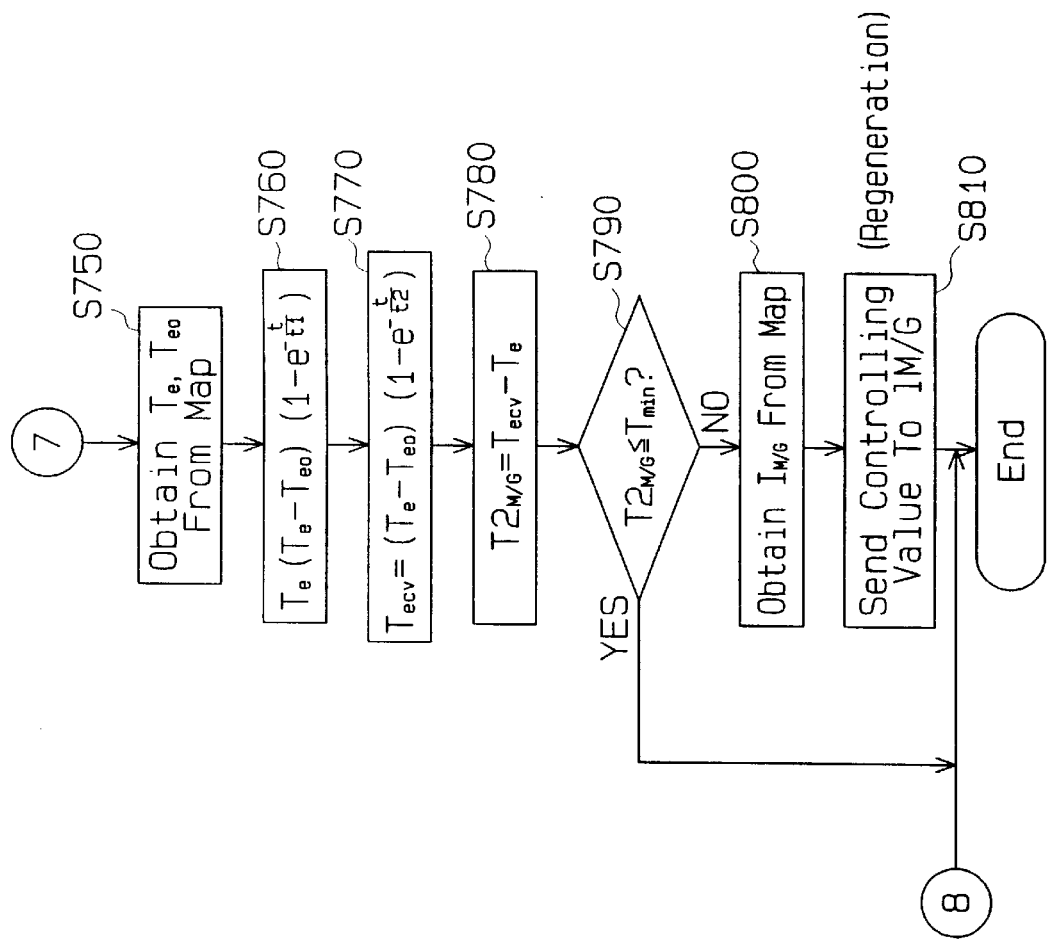
FIG. 16 is a flowchart of a motor-generator control routine executed when the CVT oil temperature is low.
Figure 16:
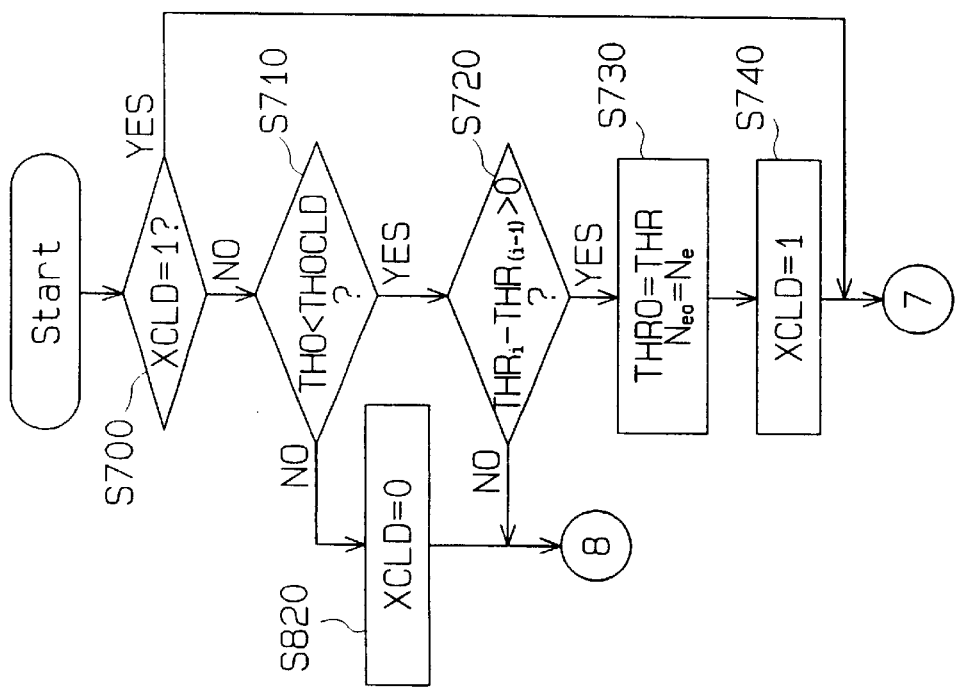

A control routine related to the temperature of the hydraulic oil in the motor-generator 12 will now be described with reference to FIG. 16. The purpose of executing this routine will first be described. When the temperature of the hydraulic oil (oil temperature) THO in the hydraulic cylinders 46, 47 is low, the movement of each cylinder 46, 47 is delayed with respect to the required oil pressure of the CVT 21. In other words, as shown in FIG. 8, the oil pressure which pushes the belt 39 becomes delayed initially if the oil temperature is low compared to when the oil temperature is normal. In this routine, regeneration controlling of the motor-generator 12 is performed to reduce engine torque. Accordingly, the torque sent to the CVT 21 is reduced and oil pressure becomes sufficient.

When entering this routine, the ECU 50 judges whether an initial oil temperature flag XCLD is set at one. If set at one, the ECU 50 proceeds to step S750. If the flag XCLD is set at zero, the ECU 50 proceeds to step S710 and judges whether the oil temperature THO is lower than a predetermined reference oil temperature THOCLD. If the oil temperature THO is equal to or higher than the reference oil temperature THOCLD, the ECU 50 proceeds to step S820 and resets the flag XCLD to zero. The execution of this routine is then terminated.

The reference oil temperature THOCLD corresponds to a lower limit that ensures normal functioning of the hydraulic oil. The value of the reference oil temperature THOCLD is obtained through experiments.

If it is determined that the oil temperature THO is lower than the reference oil temperature THOCLD in step S710, the ECU 50 proceeds to step S720. At step S720, the ECU 50 determines whether the difference between the present throttle angle $THR_i$ and the throttle angle $THR_{(i-1)}$ in the previous cycle is equal to or greater than zero, or in an accelerating state. If the difference between the present throttle angle $THR_i$ and the throttle angle $THR_{(i-1)}$ in the previous cycle is smaller than zero, or in an decelerating state, the ECU 50 terminates execution of this routine. If the difference between the present throttle angle $THR_i$ and the throttle angle $THR_{(i-1)}$ in the previous cycle is equal to or greater than zero, this indicates an accelerating state. In this case, the ECU 50 proceeds to step S730 and sets the present throttle angle THR as the initial throttle angle value THRO.

The ECU 50 also sets the present corresponding engine speed $N_e$ as the initial engine speed value $N_{eo}$. The ECU 50 then proceeds to step S740 and sets the initial oil temperature flag XCLD to one.

Steps S710 to S740 are executed if the initial oil temperature flag XCLD is not first set at zero. Accordingly, if the flag XCLD is set at one in the previous cycle, the ECU 50 jumps from step S700 to step S750.

At step S750, an engine torque $T_e$ is obtained through a map that is three-dimensional and includes the engine speed $N_e$, the operating state corresponding to the throttle angle THR, and the engine torque $T_e$. The three-dimensional map is obtained through experiments and is stored in the ROM. In step S750, the ECU 50 further obtains an initial engine torque $T_{eo}$ through a map that is three-dimensional and consists of the initial engine speed value $N_{eo}$, the initial throttle angle value THRO, and the engine torque Te. The map is obtained through experiments and experiments, and stored in the ROM.

At step S760, a first delay caused by the controlling of the engine torque is computed through the next equation.

$$T_e = T_e(T_e - T_{ea})(1 - e^{-t/t1})$$

In the above equation, t1 represents an engine onset time constant and is obtained through experiments. The value of t1 is a characteristic value of the engine 11.

At step S770, a first delay caused by controlling the CVT transmission torque $T_{ecv}$ of the CVT 21 is computed through the next equation:

$$T_{ecv} = (T_e - T_{ea})(1 - e^{t/t2})$$

In the above equation, t2 represents a hydraulic pressure onset time constant and is obtained through experiments. The value of t2 is a characteristic value of the CVT 21. The above two equations are both approximate expressions.

At step S780, the difference between the first delay $T_{ecv}$ of the CVT 21 and the first delay of the engine torque, or the second target regeneration torque $T2_{M/G}$ is computed from the next equation.

$$T2_{M/G} = T_{ecv} - T_e$$

At step S790, the ECU 50 compares the second target regeneration torque $T2_{M/G}$ with a reference regeneration torque $T_{min}$. The reference regeneration torque $T_{min}$ is referred to in order to determine whether regeneration controlling should be performed in the following steps. If the second target regeneration torque $T2_{M/G}$ is equal to or lower than the reference regeneration torque $T_{min}$, the second target regeneration torque $T2_{M/G}$ is so small that regeneration controlling of the motor-generator 12 is not necessary. In other words, the difference between the first delay $T_{ecv}$ of the CVT 21 and the first delay of the engine torque is small. Thus, the ECU 50 terminates execution of this routine. If the second target regeneration torque $T2_{M/G}$ exceeds the reference regeneration torque $T_{min}$ there is a necessity to perform regeneration controlling of the motor-generator 12.

At step S800, the ECU 50 obtains the controlled electric value $I_{M/G}$ from a map stored in the ROM. The map is three-dimensional and includes the engine speed $N_e$, a torque T, and a controlling electric current value In. This map is obtained through experiments. At step S810, the ECU 50 sends the controlling electric current value $I_{M/G}$ to the motor-generator 12 (the stator wire 33) and performs regeneration controlling of the motor-generator. That is, the motor-generator 12 functions as a generator and regenerates electric current. Although electric power is obtained by performing the regeneration controlling, engine torque is consumed to obtain the electric power. The area indicated by slanted lines in FIG. 8 shows the consumed engine torque. The ECU 50 terminates execution of this routine after step S810.

The regeneration controlling continues as long as the oil temperature THO of the hydraulic oil in the hydraulic cylinders 46, 47 of the CVT 21 is lower than the reference oil temperature THOCLD and the acceleration state continues. When the oil temperature THO becomes higher than the reference oil temperature THOCLD, the regeneration controlling of the motor-generator 12 is terminated.

When the input torque of the CVT 21 is smaller than the engine torque, the belt 39 of the CVT 21 has a tendency to slip. However, this routine reduces the engine torque and thus suppresses slipping of the belt 39. The suppression of the slipping of the belt 39 eliminates transmission loss of torque and thus improves energy efficiency.

Although only one embodiment of the present invention has been described herein, it should be apparent to those skilled in the art that the present invention may be embodied in many other specific forms without departing from the spirit or scope of the invention. For example, the present invention may be modified as described below. (A) Instead of the condenser, the battery may be used as the electric power source for performing assist controlling and regeneration controlling of the motor-generator 12. (B) The altering rate of the actual rotating speed of the engine and the CVT 21 are computed in steps S70 and S160. However, it is not required to compute the altering rate of both the engine and the CVT 21 as long as either one of the two are computed. (C) At step S770, t2 represents the hydraulic pressure onset time constant and is a characteristic value of the CVT 21. Thus, t2 is a fixed value. However, the value of t2 may be changed in accordance to the oil temperature. By changing the value of t2 in accordance with the oil temperature, regeneration controlling becomes more accurate.

Therefore, the present examples and embodiments are to be considered as illustrative and not restrictive and the invention is not to be limited to the details given herein, but may be modified within the scope of the appended claims.

What is claimed:

1. A control apparatus for a vehicle including a power transmitting system between an engine and wheels, said transmitting system having a continuously variable transmission (CVT) and a motor-generator actuated in one of a regenerating operation mode and an assisting operation mode, wherein said motor-generator serves as a generator in the regenerating operation mode and as a motor in the assisting operation mode, said apparatus comprising:

determining means for determining a shift of engine speed;

computing means for computing a total moment of inertia of the engine, the CVT and the motor-generator, for computing the torque of the engine, the CVT and the motor-generator based on each of the computed inertia moments and a difference between the engine speeds of the current cycle and the previous cycle, and for computing the total amount of torque; and correcting means for correcting the engine speed using at least one of said computed values, said correcting means selecting one of the operation modes of the motor-generator to actuate the motor-generator based on the determined shift of engine speed.

2. The apparatus as set forth in claim 1, further comprising:

detecting means for detecting a size of a throttle opening, wherein said determining means determines the engine speed shift by comparing the throttle opening of a current cycle to the throttle opening of a previous cycle to determine an increase of the engine speed based on the throttle opening in the current cycle being greater than the throttle opening in the previous cycle, and a reduction of the engine speed based on the throttle opening in the current cycle being smaller than the throttle opening in the previous cycle.

3. The apparatus as set forth in claim 2, further comprising:
a memory for storing respective inertia moments of the engine, the CVT and the motor-generator.

4. The apparatus as set forth in claim 3, wherein said determining means compares a target rotational speed of the CVT to an actual rotational speed of the CVT to determine a completion of the increase of the engine speed based on the target rotational speed being greater than the actual rotational speed by at least a first predetermined value and a completion of the reduction of the engine speed based on the target rotational speed being smaller than the actual rotational speed by at least a second predetermined value, and wherein said determining means nullifies the control operation of the motor-generator upon the determination.

5. The apparatus as set forth in claim 4 further including an electric control unit serving as said determining means, said computing means and said correcting means.

6. A control apparatus for a vehicle including a power transmitting system between an engine and wheels, said transmitting system having a continuously variable transmission (CVT) and a motor-generator actuated in one of a regenerating operation mode and an assisting operation mode, wherein said motor-generator serves as a generator in the regenerating operation mode and as a motor in the assisting operation mode, said apparatus comprising:
a power source for supplying an electric power to the motor-generator actuated in the assist operation mode and charged by the motor-generator actuated in the regenerating operation mode, wherein said motor-generator regenerates a maximum amount of voltage based on a currently residual voltage of the power source;
computing means for computing a total amount of torque of the engine, the CVT and the motor-generator, and a maximum shiftable speed based on the total amount of the torques and the maximum amount of the voltage;
adjusting means for adjusting a rotational speed of the CVT using at least one of the computed values; and
control means for controlling the adjusting means based on the maximum electric power and a target rotational speed of the CVT.

7. The apparatus as set forth in claim 6, wherein said control means includes:
a memory for storing respective inertia moments of the engine, the CVT and the motor-generator;
and
regulating means for regulating a current target rotational speed of the CVT so that the current target rotational speed is smaller than the maximum shiftable speed of the CVT.

8. The apparatus as set forth in claim 7, wherein said regulating means includes converting means for forcibly equalizing the current target rotational speed to the maximum shiftable speed of the CVT when the current target rotational speed is greater than the maximum shiftable speed of the CVT.

9. The apparatus as set forth in claim 8, wherein said regulating means includes comparing means for comparing a differential value of the current target rotational speed with the maximum shiftable speed of the CVT.

10. The apparatus as set forth in claim 9, wherein said CVT includes:
an input shaft capable of receiving the engine power;
a pair of input plates relatively movable away from and toward each other on the input shaft;
an output shaft:
a pair of output plates relatively movable away from and toward each other on the output shaft;
a power transmitting belt for operably connecting the input plates and the output plates; and
said CVT selectively increasing and reducing a rotational speed thereof based on the relative movement of the input plates toward and away form each other.

11. The apparatus as set forth in claim 10, wherein the adjusting means includes:
a hydraulic cylinder for moving one of the input plates based on hydraulic pressure therein; and
an electromagnetic valve for controlling the hydraulic pressure in the hydraulic cylinder.

12. The apparatus as set forth in claim 11, said control means includes an electric control unit for outputting an electric signal to the electromagnetic valve.

13. A control apparatus for a vehicle including a power transmitting system between an engine and wheels, said transmitting system having a continuously variable transmission (CVT) and a motor-generator actuated in one of a regenerating operation mode and an assisting operation mode, wherein said motor-generator serves as a generator in the regenerating operation mode and as a motor in the assisting operation mode, wherein the motor-generated actuated in the regenerating operation mode charges a power source to induce torque required for reducing the engine speed, wherein a maximum chargeable voltage is determined based on a currently residual voltage in the power source, and wherein speed of the vehicle is manually shifted, said apparatus comprising:
detecting means for detecting the manual shift operation for reducing a speed of the vehicle;
computing means for computing a total moment of inertial of the engine, the CVT and the motor-generator, for computing the torque of the engine, the CVT and the motor-generator based on each of the computed inertia moments and a difference between the engine speeds of the current cycle and the previous cycle, and for computing the required torque based on the vehicle speed and an acceleration of the vehicle;
comparing means for comparing the required torque and the maximum chargeable voltage; and
control means for controlling the motor-generator, wherein said control means actuates the motor-generator in the regenerating operation mode based on the required torque being smaller than the maximum chargeable voltage, and wherein said control means controls to reduce the rotational speed of the CVT based on an excessive level of the required torque when the required torque is greater than the maximum chargeable voltage.

14. The apparatus as set forth in claim 13, wherein said maximum chargeable voltage is computed based on a maximum capacitance and accumulated voltage of the power source.

15. The apparatus as set forth in claim 14, wherein said CVT includes:
an input shaft capable of receiving the engine power;
a pair of input plates relatively movable away from and toward each other on the input shaft;
an output shaft:
a pair of output plates relatively movable away from and toward each other on the output shaft;
a power transmitting belt for operably connecting the input plates and the output plates; and
said CVT selectively increasing and reducing the rotational speed thereof based on the relative movement of the input plates toward and away from each other.

16. The apparatus as set forth in claim 15, wherein the adjusting means includes:
a hydraulic cylinder for moving one of the input plates in accordance with hydraulic pressure therein; and
an electromagnetic valve for controlling the hydraulic pressure in the hydraulic cylinder.

17. The apparatus as set forth in claim 16, wherein said control means computes an insufficient level of the maximum chargeable voltage with respect to the required torque, and wherein said control means controls the electromagnetic valve to reduce the rotational speed of the CVT based on the insufficient level.

18. A control apparatus for a vehicle including a power transmitting system between an engine and wheels, said transmitting system having a continuously variable transmission (CVT) and a motor-generator actuated in one of a regenerating operation mode to reduce engine speed and an assisting operation mode to increase the engine speed, said apparatus comprising:
recognizing means for recognizing a shift of the engine speed;
computing means for computing a total moment of inertia of the engine, the CVT and the motor-generator, for computing the torque of the engine, the CVT and the motor-generator based on each of the computed inertia moments and a difference between the engine speeds of the current cycle and the previous cycle, and for computing the total amount of torque;
actuating means for actuating the motor-generator in one of the operation modes in accordance with the recognized shift of the engine speed; and
correcting means for correcting the engine speed using at least one of said computed values.

19. The apparatus as set forth in claim 18, wherein said recognizing means includes an electric control unit (ECU) for setting a current flag when the ECU recognizes the shift of the engine speed and for resetting a previous flag.

20. The apparatus as set forth in claim 19, wherein said actuating means includes said electric control unit for actuating the motor-generator in the regenerating operation mode according to the flag indicative of an increase in the engine speed increase and in the assisting operation mode according to the flag indicative of a reduction of the engine speed.

21. The apparatus as set forth in claim 20, wherein said motor-generator is alternately actuated in the regenerating operation mode and the assisting operation mode to maintain a substantially average vehicle speed.

22. A control apparatus for a vehicle including a power transmitting system between an engine and wheels, said transmitting system having a continuously variable transmission (CVT) and a motor-generator actuated in one of a regenerating operation mode to charge a power source and reduce the engine speed and an assisting operation mode to increase the engine speed, said apparatus comprising:
hydraulic control means for controlling said CVT;
detecting means for detecting a temperature of fluid in the hydraulic control means being smaller than a predetermined magnitude, wherein said predetermined magnitude is a minimum level for ensuring a start-up pressure of the fluid;
determining means for determining an increase of the engine speed;
computing means for computing torque required to reduce the engine speed in association with a delay of the start-up pressure of the fluid; and
actuating means for actuating the motor-generator in the regenerating mode to charge the power source with voltage based on the required torque, wherein the CVT includes:
an input shaft for receiving engine power;
a pair of input plates relatively movable away from and toward each other on the input shaft;
an output shaft;
a pair of output plates relatively movable away from and toward each other on the output shaft; and
a power transmitting belt for operably connecting the input plates and the output plates, wherein the rotational speed of the CVT is selectively increased and reduced based on the relative movement of the input plates toward and away from each other.

23. The apparatus as set forth in claim 22, wherein said computing means computes the required torque based on a difference between a start-up delay of the engine and a start-up delay of the CVT.

24. The apparatus as set forth in claim 23, wherein the adjusting means includes:
a hydraulic cylinder for moving one of the input plates in accordance with hydraulic pressure therein; and
an electromagnetic valve for controlling the hydraulic pressure in the hydraulic cylinder.

25. A continuously variable transmission for an engine driven vehicle, comprising:
an input shaft for receiving engine power;
a pair of input plates relatively movable away from and toward each other on the input shaft;
an output shaft;
a pair of output plates relatively movable away from and toward each other on the output shaft; and
a power transmitting belt for operably connecting the input plates and the output plates, wherein the rotational speed of the CVT is selectively increased and reduced based on the relative movement of the input plates toward and away from each other.

* * * * *